UNITED STATES PATENT OFFICE.

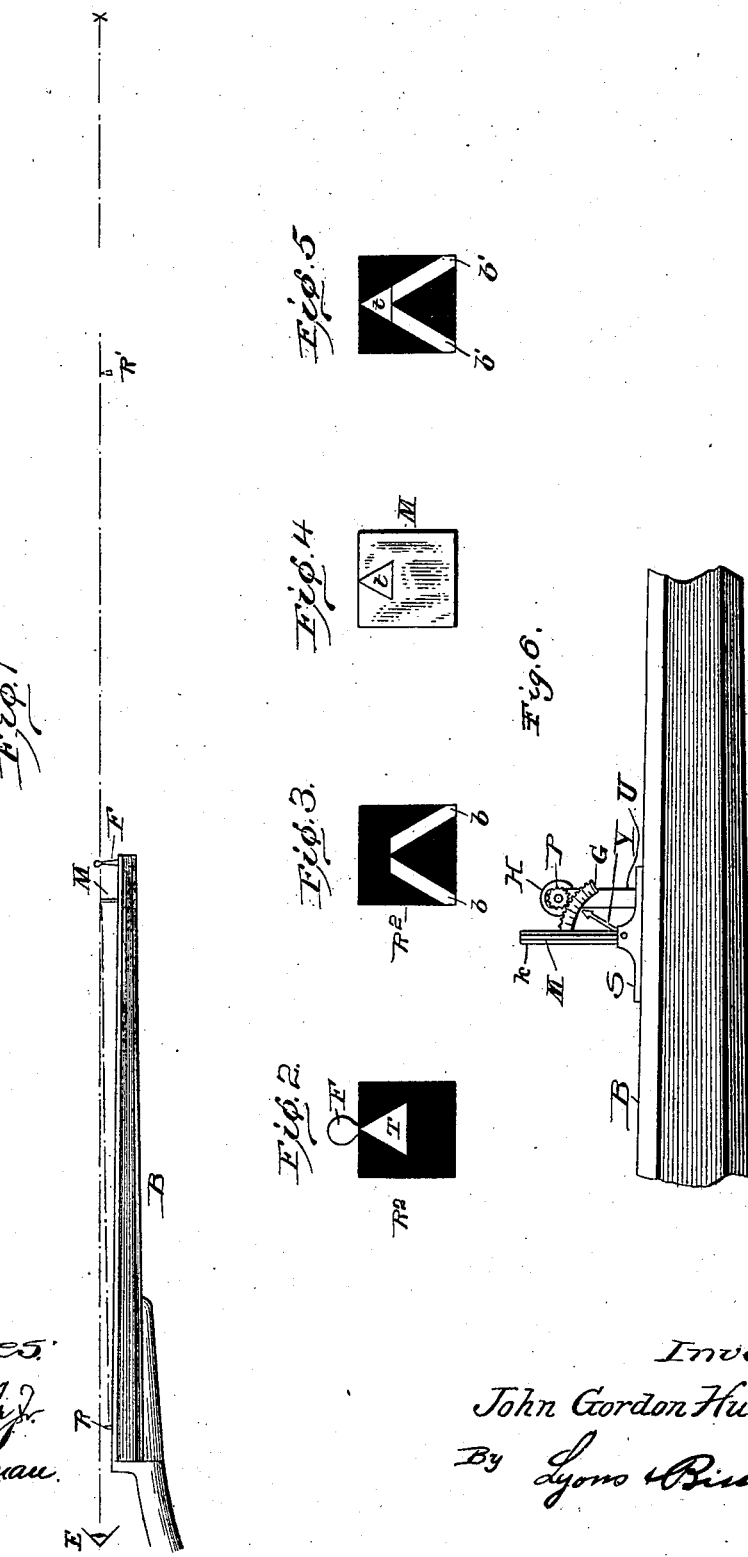

JOHN G. HUBBARD, OF WOODS HOLE, MASSACHUSETTS.

SIGHT FOR FIREARMS.

SPECIFICATION forming part of Letters Patent No. 722,844, dated March 17, 1903.

Application filed May 2, 1902. Serial No. 105,625. (No model.)

*To all whom it may concern:*

Be it known that I, JOHN GORDON HUBBARD, a citizen of the United States, and a resident of Woods Hole, county of Barnstable, State of Massachusetts, have invented certain new and useful Improvements in Sights for Firearms, of which the following is a specification.

My invention has reference to improvements in sights for firearms, and while applicable to all kinds of firearms it is more particularly designed for use in connection with small-arms, and especially in connection with rifles.

The ordinary or more usual form of rifle-sights comprises a front sight near the muzzle of the gun, remote from the eye of the user, and a rear sight near the breech of the gun and rather close to the eye of the shooter. In aiming the rifle these two sights are brought into line with the object aimed at, so that when these three points cover each other the aim is judged to be accurate. In thus aiming the eye of the shooter is necessarily focused on one of these three points and is therefore only imperfectly focused on the two other points. When the eye is focused on the front sight, this being comparatively distant from the eye, little difficulty is experienced in perceiving at the same time the object aimed at; but in that case the rear sight is only indistinctly seen, and uncertainty of aim results therefrom.

The object of my invention is to overcome this difficulty by relieving the shooter from the necessity of focusing on the rear sight, and this object is attained by providing a mirror near the front sight, in which the shooter sees the image of the rear sight projected forwardly between the front sight and the object aimed at. In this manner the three points to be brought into alinement are the front sight, the image of the rear sight in front of the front sight, and the object aimed at. In this condition when the eye is focused accurately upon any one of these points the two others will still be quite clearly seen.

The arrangement which I employ is illustrated in the accompanying drawings, in which—

Figure 1 is an elevation of the gun-barrel with my improved arrangement of sight and mirror. Fig. 2 is an elevation of one form of improved rear sight which I may employ, showing at the same time the image of that rear sight in conjunction with the front sight. Fig. 3 illustrates another form of rear sight which I may employ when a separate front sight is dispensed with. Fig. 4 represents the mirror employed when a separate front sight is dispensed with. Fig. 5 illustrates the juxtaposition of the image of the rear sight and a mark on the mirror of Fig. 4 used when a separate front sight is dispensed with, and Fig. 6 shows an adjustable mirror.

The general arrangement of my improved rifle-sights appears in Fig. 1. In this figure of the drawings, B represents the barrel of the gun; R, the usual and most common rear sight; F, the most common front sight, and M a small plane mirror mounted on the barrel in the rear of but close to the front sight. This mirror is fixed with its plane at right angles to the axis of the barrel. If in using the gun the eye of the shooter is located at E, the image of the rear sight will be seen at R', and immediately above it will be seen the head or tip of the front sight. Therefore in aiming the gun at the object X it is necessary to bring the tip of the front sight, the image of the rear sight, and the object X in alinement. Under these conditions the eye, as is the best practice in shooting, may be focused at the object aimed at, and the front sight and the image of the rear sight will still be distinctly seen, since they are comparatively remote from the eye, certainly more remote from the same than the rear sight. While this arrangement is applicable to any kind of rear and front sights, there are certain forms of these sights which may be used with special advantage. Thus, for instance, with the ordinary front sight I may use a rear sight consisting of a little black-surfaced plate $R^2$, having a white triangle T painted or fixed thereon. The image of this rear sight will appear in the mirror like the rear sight itself, and projected against it, at the apex of the white triangle, the tip of the front sight F will be seen. The use of the mirror also enables me to dispense with a separate front sight altogether, using in its place a distinct mark on the mirror, as shown in Fig. 4. Here the mirror M has painted or fixed thereon, near its upper edge, a small triangle *t*, with its apex just touching the edge. In conjunction with such combined mirror and front sight there may be used as a rear sight a black plate with two white bars inclined toward each other, as shown in Fig. 3. These bars *b b* will be seen in the mirror as represented in Fig. 5, and immediately above the upper edges of these bars will be seen the white triangle *t*, painted on or fixed to the mirror, with its base contacting the upper edges of the images *b' b'* of the two bars. In other words, the rear and front sights when juxtaposed complete a geometrical design.

It will be understood that the white triangle on the rear sight, (represented in Fig. 2,) the two white bars on the rear sight, (shown in Fig. 3,) and the white triangle on the mirror (shown in Fig. 4) could with advantage be constructed as separate little plates upon the rear sight and mirror respectively, and such material would be chosen as does not easily get soiled—as, for instance, ivory or celluloid.

In practice I have found my arrangement of sights to work admirably, and particularly to improve the aim of shooters whose eyes have lost the power of rapid accommodation to different distances.

If the mirror is mounted with its plane exactly at right angles to the axis of the gun, the sights are fitted for point-blank shooting. For this reason it may be of advantage to mount the mirror so that it can be adjusted to different inclinations toward the front sight. The greater this inclination is the more the gun will have to be elevated in order to bring the two sights into coincidence with the object aimed at, so that the mirror, thus made adjustable, serves all the purposes of an adjustable rear sight. Such arrangement is shown in Fig. 6. The mirror M is here mounted in a little frame *k*, pivoted to a base-plate S, which is fixed to the barrel. To the frame of the mirror is secured a segmental gear G, into which meshes a pinion P, journaled in an upright U, so that it can be turned by a milled head H. The segmental gear is graduated, as indicated, and a pointer Y, fixed to the base-plate S, is designed to indicate the inclination of the mirror in yards of distance of the object aimed at. Other arrangements for making the mirror adjustable will readily suggest themselves to those skilled in the art, and I am not limited to any particular mechanism for this purpose.

Having now fully described my invention, I claim and desire to secure by Letters Patent—

1. A sight for firearms comprising a rear sight, a front sight and a mirror to aline the image of the rear sight and the front sight.

2. A sight for firearms comprising a rear sight, a front sight and a mirror therebetween to aline the image of the rear sight and the front sight.

3. A sight for firearms comprising a rear sight, a mirror carrying a front sight and arranged to aline the image of the rear sight and the front sight.

4. A sight for firearms comprising a rear sight and a front sight arranged to complete a geometrical design when juxtaposed and a mirror to aline the image of the rear sight and the front sight.

5. A sight for firearms comprising a rear sight, composed of a bright object on a dark ground, a mirror carrying a front sight in the form of a bright object and arranged to aline the image of the rear sight and the front sight.

In testimony whereof I have signed my name to this specification in the presence of two subscribing witnesses.

JOHN G. HUBBARD.

Witnesses:
M. H. WALSH,
GEO. H. SHERWOOD.